J. T. HILL.
INSECTICIDE PRODUCING AND SPRAYING APPARATUS.
APPLICATION FILED JULY 11, 1908.
985,174.
Patented Feb. 28, 1911.
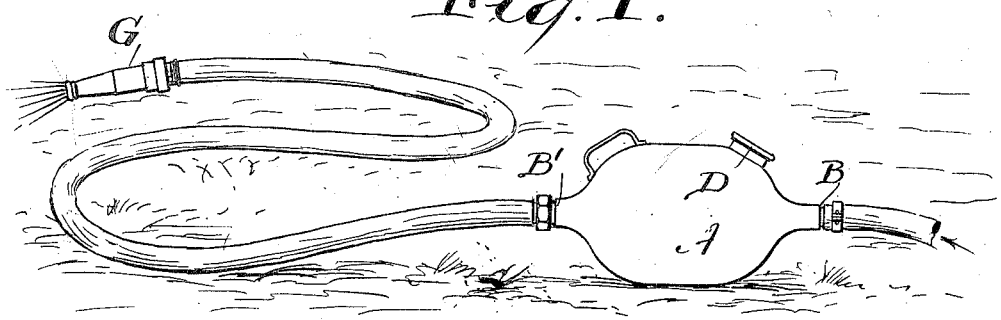
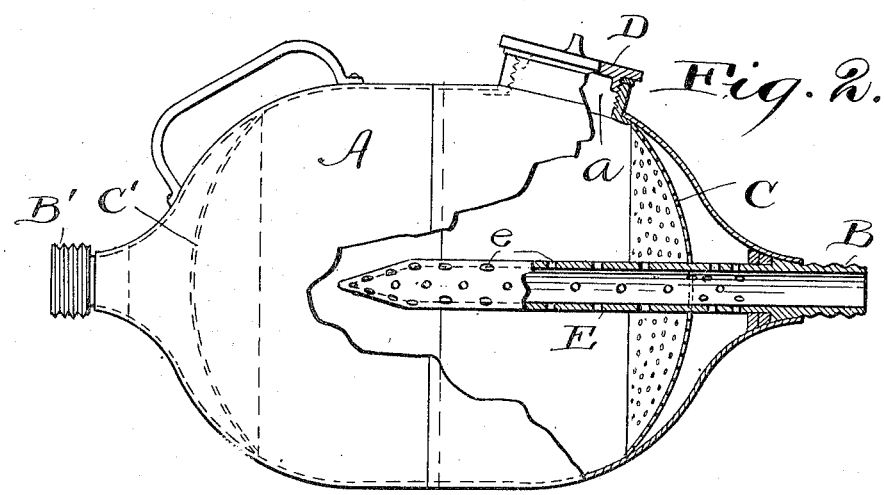
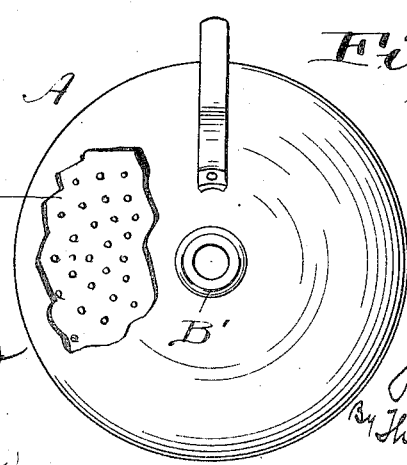

UNITED STATES PATENT OFFICE.

JOHN T. HILL, OF CLEVELAND, OHIO.

INSECTICIDE PRODUCING AND SPRAYING APPARATUS.

985,174.  Specification of Letters Patent.  Patented Feb. 28, 1911.

Application filed July 11, 1908. Serial No. 443,043.

*To all whom it may concern:*

Be it known that I, JOHN T. HILL, a citizen of the United States, residing at Cleveland, in the county of Cuyahoga and State of Ohio, have invented a certain new and useful Improvement in Insecticide Producing and Spraying Apparatus, of which the following is a full, clear, and exact description.

The object of this invention is to provide an inexpensive device with which to produce soap suds or some analogously produced form of insecticide and spray it on trees and other forms of plant life.

The invention consists of the features of construction hereinafter described as specified definitely in the claim.

In the drawing, Figure 1 is a perspective view of a device connected with two sections of ordinary garden hose. Fig. 2 is a side elevation partly in section of the device embodying the invention. Fig. 3 is an end view partly broken away of said device.

The device includes a metal case A having its tubular ends suitably shaped for attachment with hose sections B, B'. Within this casing near its respective ends are two perforated partitions C, C' which form the ends of a chamber. In the wall of the casing is a hole $a$ leading to this chamber, and through which soap or other analogous material may be introduced. This hole may be closed by a screw plug D or other suitable means.

A pipe E is connected in the inlet end of the casing. The outer prolongation of this pipe is shaped for connection with the hose. The inward extension of the pipe extends through the adjacent perforated partition C into the central chamber; and this pipe, within the casing, is perforated as shown.

Soap or other slowly soluble insecticide is put into the chamber through the opening $a$, and the plug D screwed in. The device being connected with hose sections B, B, and one of said sections being connected with a suitable water supply, the apparatus is now ready for use. When the water is turned on, it will enter the chamber containing the soap or other soluble insecticide, through the perforations $e$ in the pipe E. The water will permeate the soap and enough of it will be dissolved to form an insecticide solution, which solution may be discharged from the nozzle G into trees or other forms of plant life.

Having described my invention, I claim:

In an insecticide forming and spraying apparatus, the combination of a metal casing, perforated end wall members within said casing, an inlet tube supported by the casing, said tube extending through one of the wall members and being provided with perforations, said casing being provided with an outlet nozzle and with an opening through which disinfecting material may be introduced into the casing.

In testimony whereof, I hereunto affix my signature in the presence of two witnesses.

JOHN T. HILL.

Witnesses:
E. L. THURSTON,
H. R. SULLIVAN.